United States Patent

Meinerth et al.

[19]

[11] Patent Number: 6,078,339
[45] Date of Patent: Jun. 20, 2000

[54] MUTUAL EXCLUSION OF DRAWING ENGINE EXECUTION ON A GRAPHICS DEVICE

[75] Inventors: Kim A. Meinerth, Granite Bay; Aditya Sreenivas, El Dorado Hills; Krishnan Sreenivas, Rancho Cordova, all of Calif.

[73] Assignee: Intel Corporation, Santa Clara, Calif.

[21] Appl. No.: 09/021,490

[22] Filed: Feb. 10, 1998

[51] Int. Cl.[7] .................................................. G06F 15/00
[52] U.S. Cl. ............................................ 345/522; 345/502
[58] Field of Search .................................. 345/514, 501, 345/502, 506, 513, 522, 505

[56] References Cited

U.S. PATENT DOCUMENTS

| | | | |
|---|---|---|---|
| 4,598,384 | 7/1986 | Shaw et al. ............................. | 395/117 |
| 5,440,746 | 8/1995 | Lentz ....................................... | 345/504 |
| 5,481,276 | 1/1996 | Dickey et al. ........................... | 345/132 |
| 5,745,761 | 4/1998 | Celi, Jr. et al. ......................... | 709/301 |
| 5,781,199 | 7/1998 | Oniki et al. ............................. | 345/505 |
| 5,861,893 | 1/1999 | Sturgess .................................. | 345/525 |

*Primary Examiner*—Kee M. Tung
*Attorney, Agent, or Firm*—Blakely, Sokoloff, Taylor & Zafman LLP

[57] ABSTRACT

A method for mutual exclusion of drawing engine execution on a graphics device is disclosed. The method checks a busy signal of an executing drawing engine. The executing drawing engine is one of a plurality of drawing engines of the graphics device and the only drawing engine executing out of the plurality of drawing engines. The method forwards a graphics instruction and associated data packet to a next drawing engine to execute after the executing drawing engine has completed execution. The next drawing engine to execute is one of the plurality of drawing engines.

24 Claims, 5 Drawing Sheets

MUTUAL EXCLUSION OF DRAWING ENGINE EXECUTION ON A GRAPHICS DEVICE

BACKGROUND OF THE INVENTION

(1) Field of the Invention

The present invention is in the field of graphics data processing for display, more specifically, the method and apparatus of the present invention is related to the mutual exclusion of drawing engine execution.

(2) Related Art

A computer graphics device typically has numerous drawing engines for modifying a next frame data for display. Each drawing engine may be required to modify data provided to other drawing engines for further processing. With currently available technology, data coherency is sometimes lost when a next frame data is accessible for modification by multiple drawing engines.

It is therefore desirable for a method and an apparatus for providing data coherency for data accessible by multiple drawing engines.

BRIEF SUMMARY OF THE INVENTION

A method for mutual exclusion of drawing engine execution on a graphics device is disclosed. The method checks a busy signal of an executing drawing engine. The executing drawing engine is one of a plurality of drawing engines of the graphics device and the only drawing engine executing out of the plurality of drawing engines. The method forwards a graphics instruction and associated data packet to a next drawing engine to execute after the executing drawing engine has completed execution. The next drawing engine to execute is one of the plurality of drawing engines.

DETAILED DESCRIPTION OF THE INVENTION

The present invention guarantees that multiple drawing engines do not execute simultaneously and provides data coherency where one drawing engine reads an operand that has just been written by another drawing engine. Further, the present invention guarantees data coherency across data streams, local memory data paths and through an accelerated graphics port (AGP).

Figure 1:
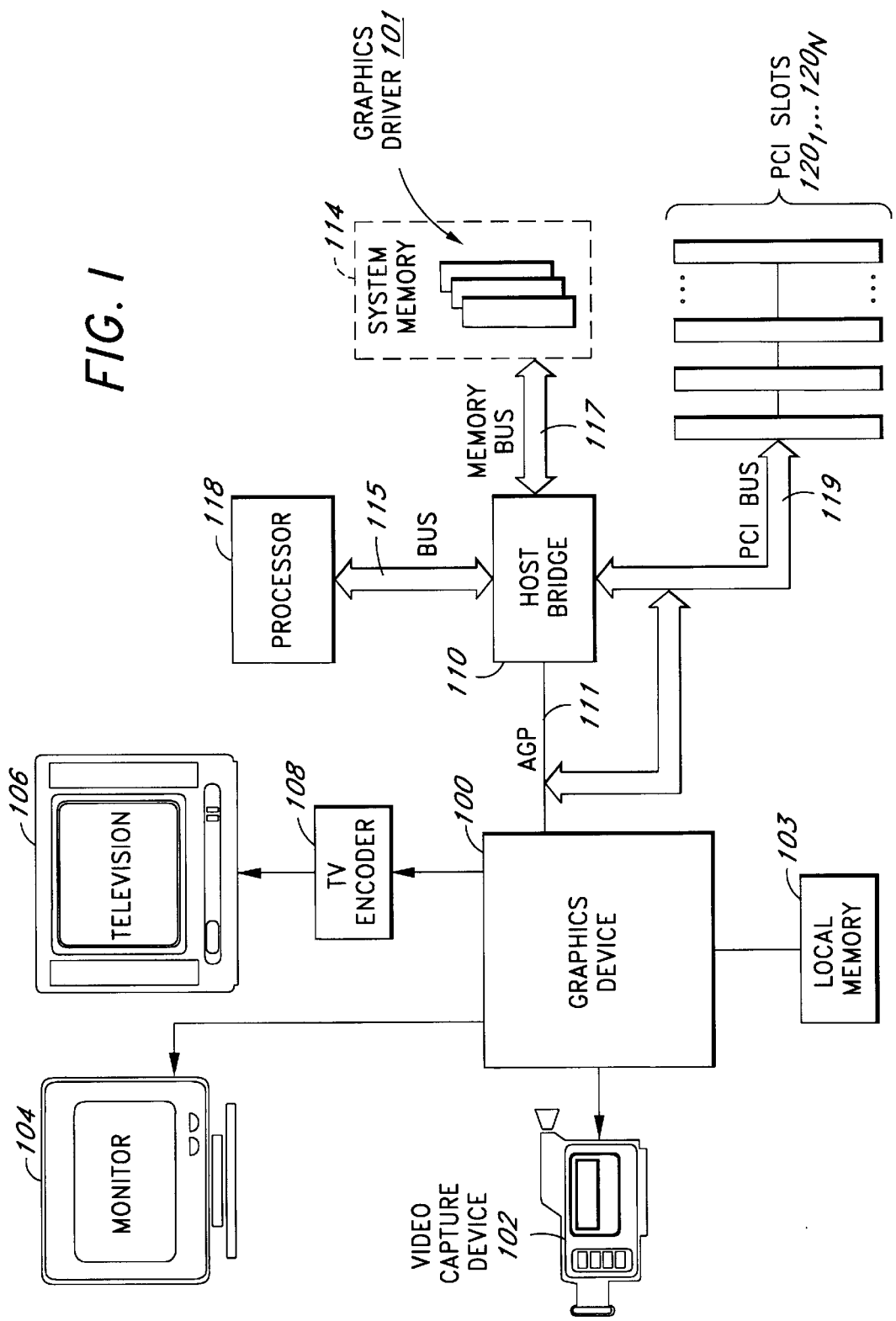
FIG. 1 illustrates an exemplary computer system with the present invention's method and apparatus for mutual exclusion of drawing engine execution.

FIG. 1 illustrates an exemplary computer system having the present invention's mechanism for mutual exclusion of drawing engine execution. A graphics device 100 is capable of accepting video data from a video capture device 102 and of displaying the video data to a video display device such as a computer monitor 104 or a television monitor 106 through an encoder 108. Graphics device 100 is coupled to a local memory 103. Various drawing engines (not shown) FIG. 1 including but not limited to a three-dimensional (3D) pipeline engine, a blitter (blit) engine, and a stretch blitter (blit) engine in the graphics device 100 process video data for display.

A host bridge 110 couples together the graphics device 100 through an accelerated graphics port (AGP) 111, a processor 118 though bus 115, PCI devices $120_1$ through $120_N$ by means of PCI bus 119, and a system memory 114 having a graphics driver 101 through bus 117. The processor 118 as referred herein may be an Intel Pentium® II processor.

The PCI devices $120_1$ through $120_N$ are input/output hardware devices connected to the system through, for example, a PCI expansion connector (not shown) or mounted to the personal computer (PC) motherboard (not shown). Examples of PCI devices include but are not limited to a graphics controller/card, a disk controller/card, a local area network (LAN) controller/card and a video controller/card. The AGP 111 is a port that connects the graphics device to the host bridge 110 for access to the first instance of processor. In one embodiment, the AGP 111 is designed to optimize the graphics data transfer operations in high speed personal computers (PC).

With the present invention, memory accesses such as read and write operations by the drawing engines may be performed to the local memory 103 and/or through AGP 111 data paths.

The present invention ensures fewer page breaks. More specifically, if only one drawing engine is operating at any one time, memory accesses tend to show greater spatial and temporal locality resulting in fewer page breaks. Further, guaranteeing that only one drawing engine is active at any one time limits the number of data streams generated per each read and write operations by the drawing engines and keeps the drawing engine read and write accesses localized. Additionally, the clocks of the idle drawing engines may be stopped to conserve power.

Figure 2:
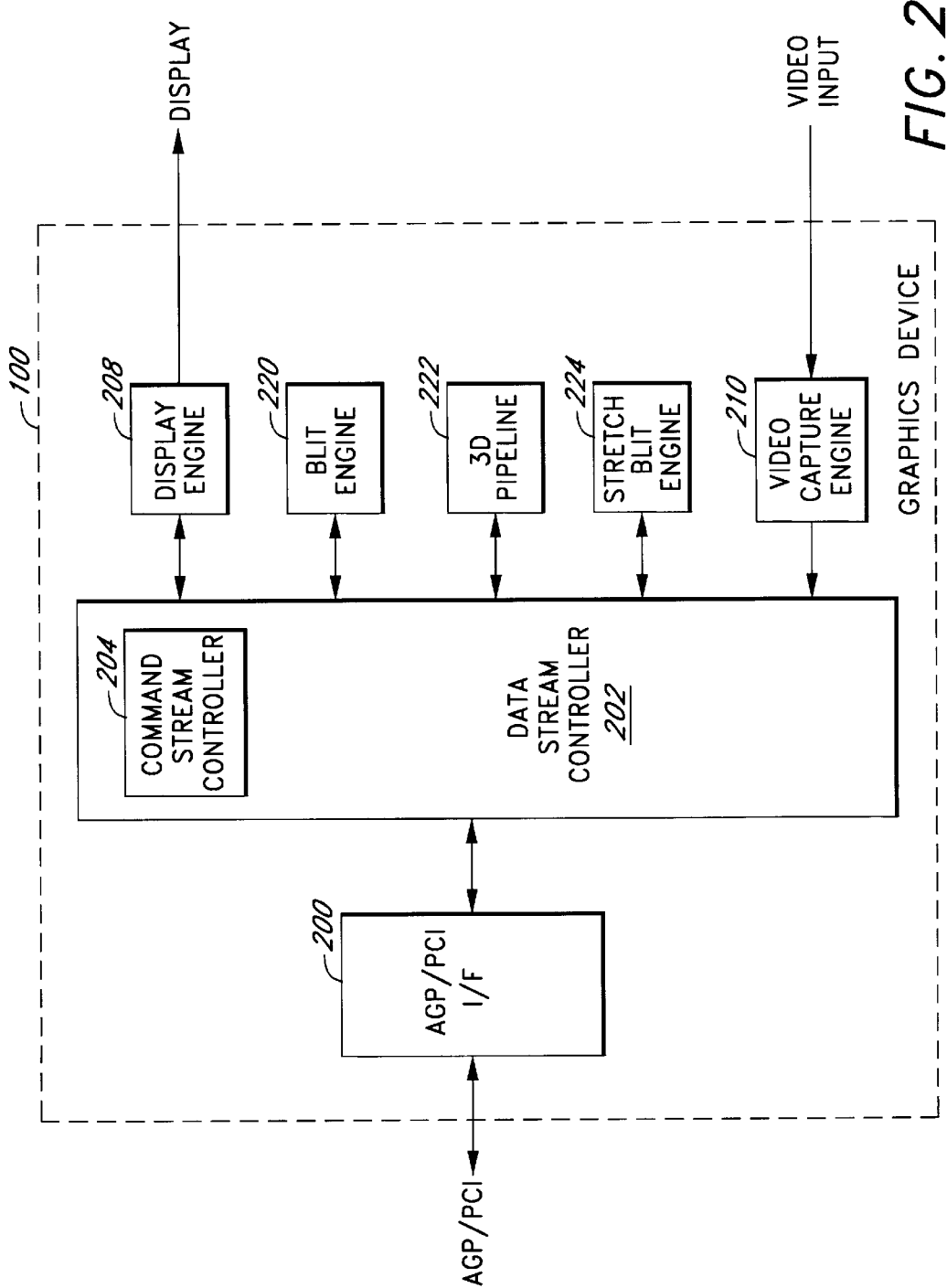
FIG. 2 illustrates an exemplary block diagram of the graphics device referred to in FIG. 1.

FIG. 2 illustrates an exemplary block diagram of the graphics device referred to in FIG. 1. The graphics device 100 has an AGP/PCI interface 200 through which the graphics device 100 transmits and receives information to and from the AGP 111 and the PCI bus 119. The AGP/PCI interface 200 is in turn coupled to a data stream controller 202. The data stream controller 202 controls the flow and the processing of various data entering and leaving the graphics device 100.

In one embodiment, the data stream controller 202 may have a plurality of data stream controllers, at least one for each different type of data. In the embodiment of the present invention, the data stream controller 202 has at least a command stream controller 204 for processing various instructions received by the graphics device 100.

The command stream controller 204 decodes graphics instructions received by the graphics device 100 from the processor 118, as well as from applications in system memory 114 and/or the PCI devices PCI devices $120_1$ through $120_N$ and has a plurality of operating registers (not shown) FIG. 2 capable of holding status information indicating, for example, the processing status of various graphics instructions.

The graphics device 100 also has various drawing engines including but not limited to a blitter (blit) engine 220, multiple three-dimensional (3D) engines in a 3D pipeline engine 222 and a stretch blitter (blit) engine 224. Blitter refers to two-dimensional (2D) processing of data.

The blit engine 220 takes data from the local memory 103 or the AGP, performs raster operations on it before writing the data back to the local memory 103 or the AGP. The blit engine 220 also copies a back buffer data located either in the local memory 103 or made available through the AGP into a front buffer. Raster refers to a vertical scan performed to produce an image on a screen as is well known in the art. The front buffer holds information to be displayed onto a display device (not shown).

The 3D engines in the 3D pipeline 222 perform rendering operations to the back buffer. More specifically, the 3D engines in the 3D pipeline 222 perform various graphics manipulations including but not limited to depth calculation which determines whether a pixel is visible or hidden on a screen, color calculation which controls the color on a screen and shade calculation which controls shading on a screen for the frame to be displayed on a display device. The 3D engines in 3D pipeline 222 accept various inputs including but not limited to vertex information for triangles and lines of images and triangle packets having various information including but not limited to colors, textures, transparency and state information.

The stretch blit engine 224 takes as input the image to be transformed and the parameters indicating the direction and length an image is to be expanded or shrunk.

A primary display engine 208 coupled to the data stream controller 202 takes data from the front buffer which is located in the AGP or the local memory 103 and forwards data to a digital-to-analog converter (not shown) for display to a display device. The front buffer data is typically modified or processed by the blit engine 220 prior to the primary display engine 208 processing the front buffer data for display on a display device.

All video inputs from a video capture device 102 are processed through a video capture engine 210. The video capture engine 210 decodes captured data for internal processing.

Figure 3A:
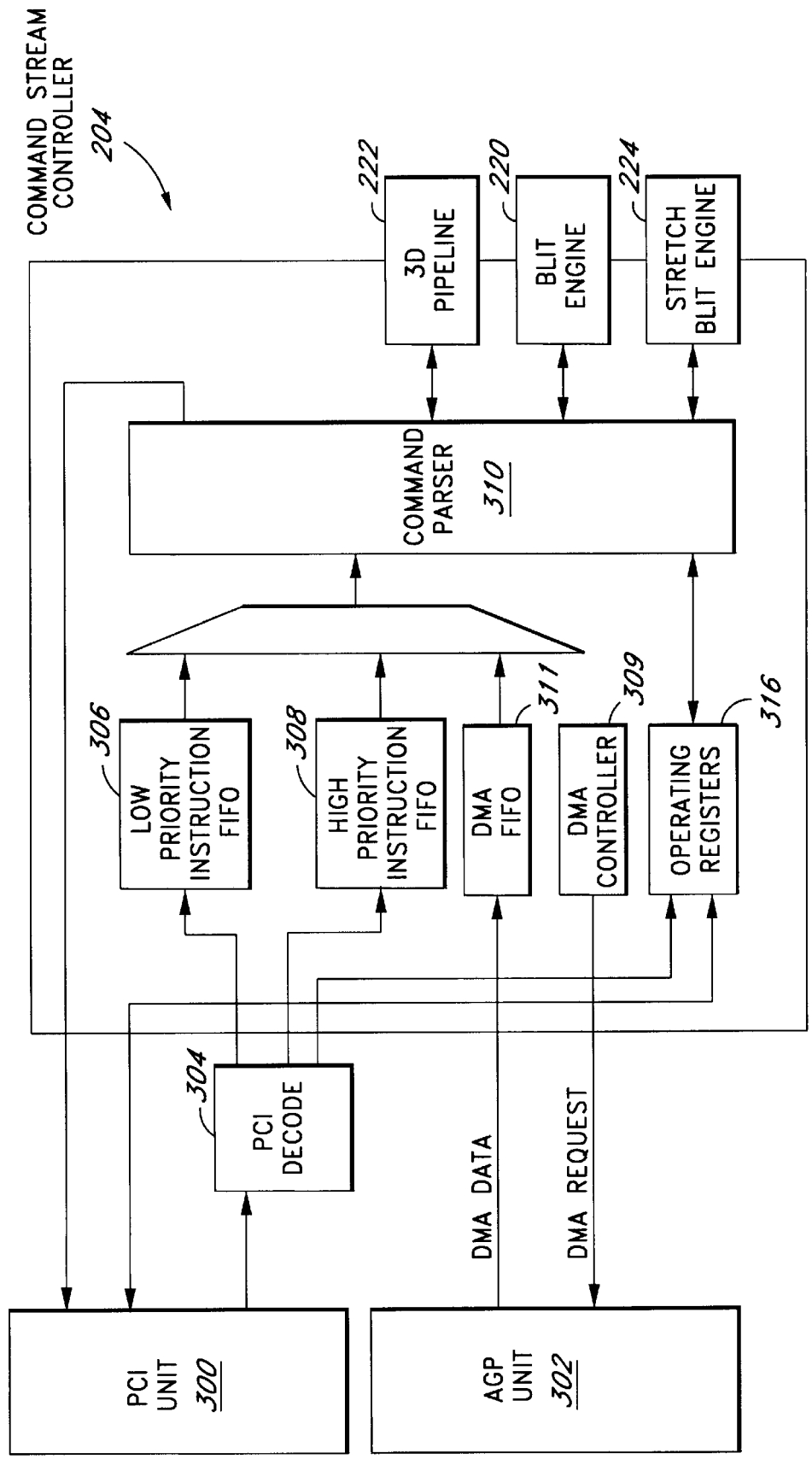
FIG. 3a is a block diagram of one embodiment of a command stream controller of the graphics device of the present invention.

FIG. 3a is one embodiment of a data path of the command stream controller 204 of the graphics device 100 of the present invention.

The present invention's mutual exclusion of drawing engine execution is performed at a command parser 310 of the command stream controller 204. More specifically, the present invention guarantees that the 3D engines in the 3D pipeline 222, the blit engine 220 and the stretch blit engine 224 do not execute simultaneously.

In the present invention, a graphics driver 101 generates various drawing engine instructions to format, process and render the next frame to be displayed on a display device. In one embodiment, each drawing engine instruction has an associated data packet. For example, the blit instruction may have a blit packet, the 3D rendering instruction may have a triangle packet for rendering triangular shapes on the frame to be displayed and the stretch blit instruction may have a stretch blit packet.

The graphics driver 101 couples various drawing engine instructions directed towards a specific drawing engine through an accelerated graphics port interface (AGP I/F) 302 and couples in the AGP 302 and forwards an associated data packet containing a data starting address and data length information to the command parser 310 through the a PCI interface (PCI I/F) 300. The data packets are decoded through a PCI decode 304 and forwarded to either a low priority instruction first-in first-out (FIFO) queue 306 or a high priority instruction FIFO queue 308 depending on the data packet's processing priority. The data address and data length information in the data packet are later referenced by the appropriate drawing engines in executing a corresponding instruction. The corresponding instructions also generated by the graphics driver 101 are read by direct memory access (DMA) into a DMA FIFO 311. The various instructions are then multiplexed and forwarded to the command parser 310 which forwards each instruction to the appropriate drawing engine only when all other drawing engines are idle.

Figure 3B:
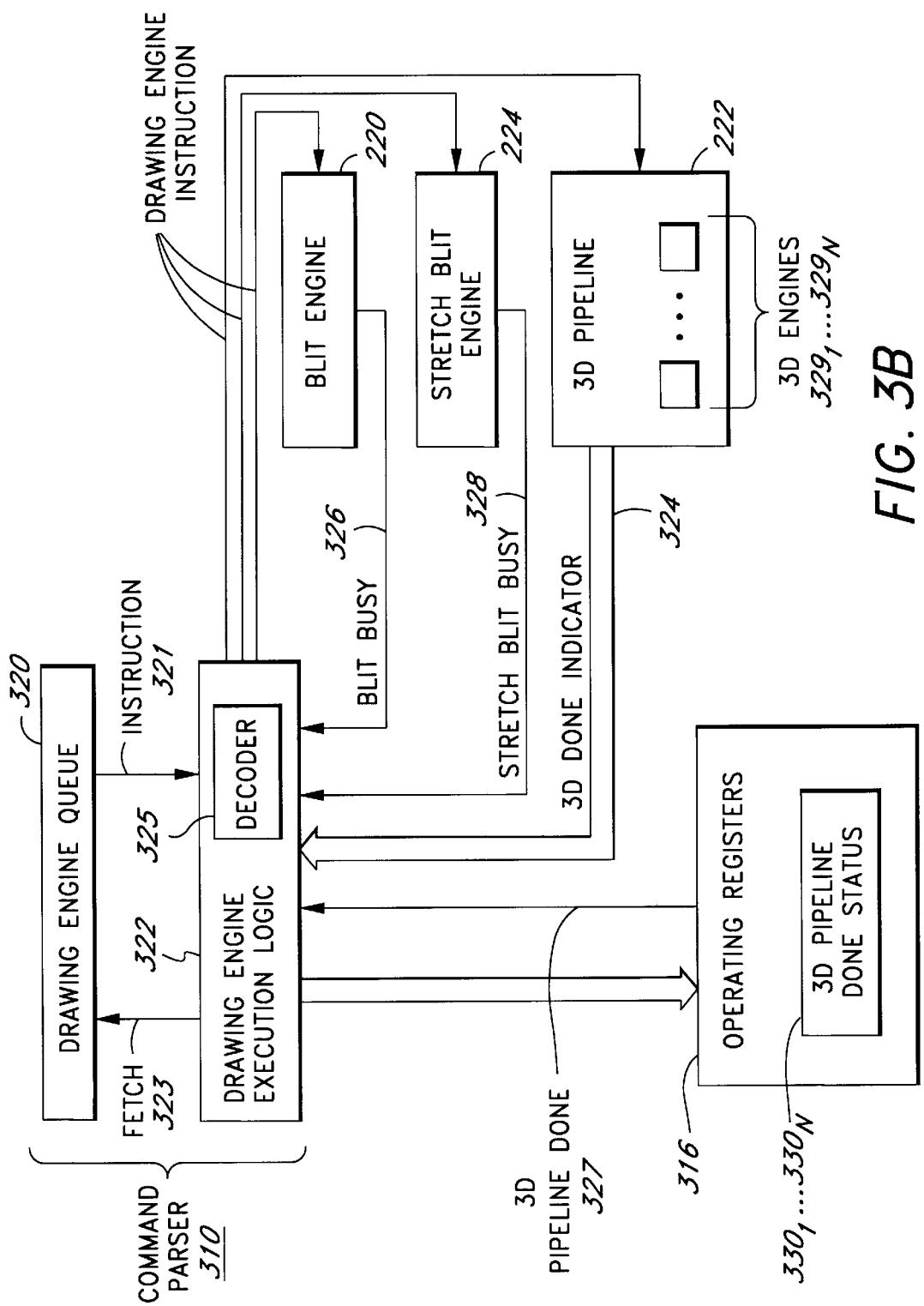
FIG. 3b is a block diagram of one embodiment of the command parser of the graphics device of the present invention.

FIG. 3b is a block diagram of one embodiment of a command parser 310 of the graphics device 100. Each drawing engine is capable of executing various instructions generated by the graphics driver 101.

The 3D engines in the 3D pipeline 222 may execute various 3D pipeline instructions including but not limited to a triangle instruction for providing triangle vertex data and a line instruction for providing line vertex data. The instructions are forwarded to the command parser 310 and held in a drawing engine queue 320 until a drawing engine execution logic 322 is ready to fetch (323) the instruction 321 from the drawing engine queue 320. In one embodiment, the drawing engine queue 320 is a first-in first-out queue. The command parser 310 performs the decode on the instructions fetched and forwards the decoded information to the 3D pipeline 222 only when the blit engine 220 and the stretch blit engine 224 are idle.

The blit engine 220 is capable of executing various blit instructions including but not limited to a full load (three operands) blit instruction, a common (two operands) blit instruction, text blit instruction for processing text, blitter setup blit instruction for setting up the state for drawing commands, blitter scan line blit instruction for complex drawing such as for circles, blitter PCI instruction for forwarding video capture data to cacheable memory for compression and blitter immediate instruction for providing data through the command stream. The instructions initiate any one of the 256 possible raster operations. The instructions are forwarded to the drawing engine execution logic 322 which performs a decode on the instructions through a decoder 325 and forwards the decoded information to the blit engine 220 only when the 3D pipeline 222 and the stretch blit engine 224 are idle.

The stretch blit engine 224 is capable of executing various stretch blit instructions including but not limited to a stretch blitter full load instruction and a stretch blitter common blit instruction. The instructions are forwarded to the command parser 310's drawing engine queue 320 until fetched by the drawing engine execution logic 322. The drawing engine execution logic 322 performs a decode on the instructions through the decoder 325 and forwards the decoded information to the stretch blit engine 224 only when the 3D pipeline 222 and the blit engine 220 are idle.

When executing instructions, each drawing engine generates and forwards a busy indicator to the command parser 310 to indicate its current status. For example, the stretch blit engine 224 generates and forwards an asserted stretch blit busy signal 328 to the command parser 310 whenever it is busy performing a stretch blit instruction. The blit engine 220 generates and forwards an asserted blit engine busy signal 326 to the command parser 310 whenever it is busy performing a blit engine instruction.

For the 3D pipeline 222, the command stream controller's operating registers block 316 generates an asserted 3D pipeline done signal 327 only if its 3D pipeline done status bit 330 is asserted indicating that the 3D pipeline 222 is idle. The 3D pipeline done signal 327 is a function of the 3D done indicator 324 generated by various 3D engine $329_1$ through $329_N$ of the 3D pipeline 222. Examples of various 3D engine $329_1$ through $329_N$ of the 3D pipeline 222 include but are not limited to a windows mask unit, a plane converter, a color calculator, an interpolator and a texture pipe. Whenever any one of the 3D engines $329_1$ through $329_N$ of the 3D pipeline 222 begin executing, each executing 3D engine forwards a 3D done indicator 324 to the command parser 310 which causes the 3D pipeline done status 330 bit corresponding to the executing 3D engine unit of the operating registers block 316 to be de-asserted indicating that the 3D pipeline 222 has at least one executing 3D engine and is busy. When all 3D engine $329_1$ through $329_N$ have completed execution, the 3D pipeline status bits $330_1$ . . . $330_N$ in the operating registers block 316 is asserted and a 3D pipeline done signal 327 is generated by the operating registers block 316 indicating that the 3D pipeline 222 is idle.

Thus, the command parser 310 in the command stream controller 204 decodes the 3D pipeline instruction, the blit instruction and the stretch blit instruction forwarded by the AGP I/F 302 and the PCI I/F 300 and only forwards the information to the corresponding drawing engine for execution when the remaining drawing engines are idle as indicated by each drawing engine's busy signal.

Figure 4:
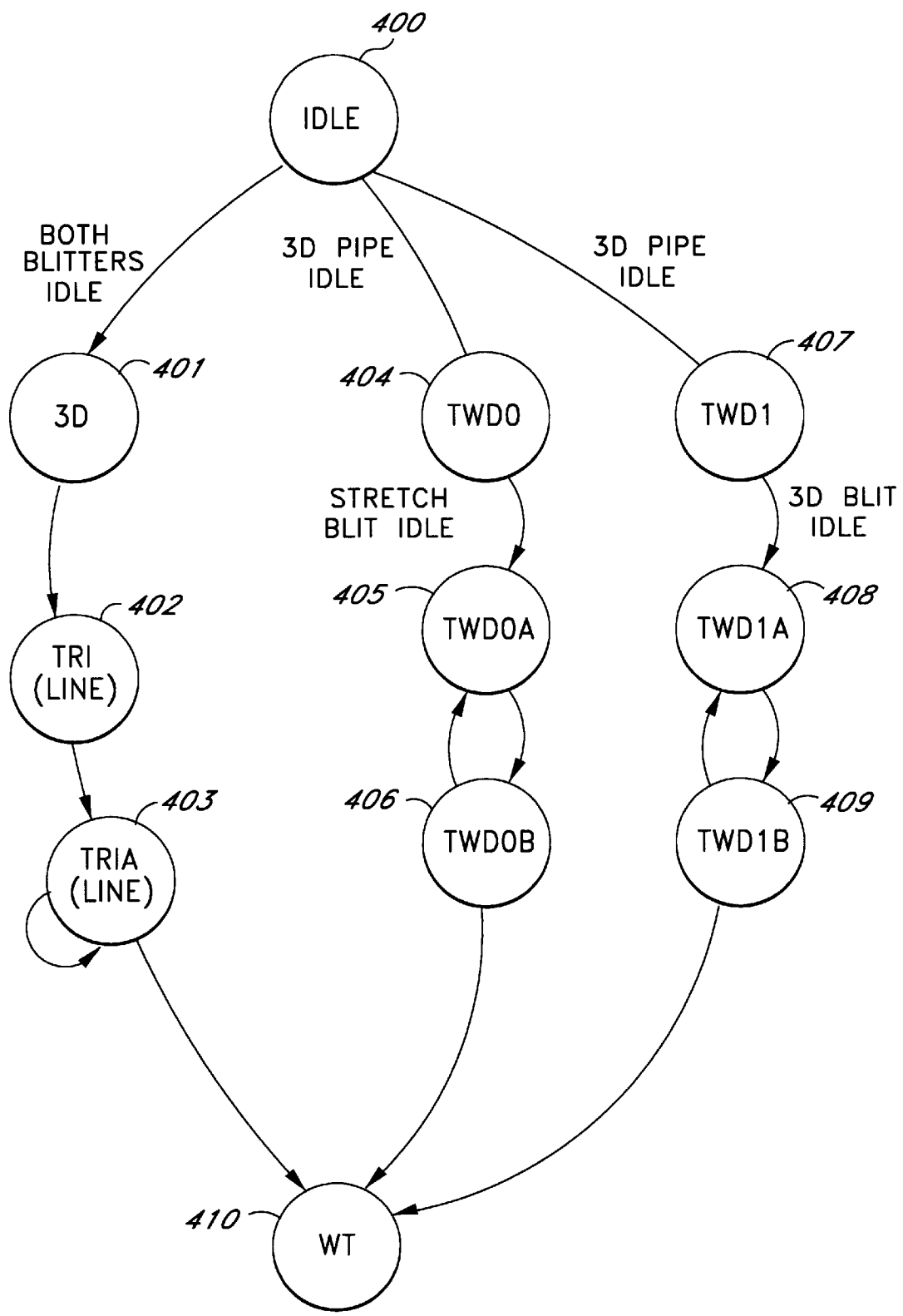
FIG. 4 is a state diagram illustrating one embodiment of the process flow of the present invention.

FIG. 4 is a command parser state diagram illustrating one embodiment of the process flow of the present invention. The command parser 310 decodes a data packet, such as a triangle packet, to be processed by the 3D pipeline 222 forwarded by the AGP and the PCI only when both the blit engine 220 and the stretch blit engine 224 are idle. This command parser state transition is indicated by the transition from state 400 (idle) to state 401 (3D). The status of the stretch blit engine 224 and the blit engine 220 are indicated by the stretch blit busy signal and the blit busy signal respectively. A de-asserted busy signal is generated by the two blit engines and forwarded to the command parser 310 to indicate that the blit engines are idle.

The command parser state transitions from state 401 (3D) to state 402 (TRI) when the command parser 310 stores information regarding the number of triangles to be processed for the next frame to be displayed. In the TRIA state 403, the vertex information is sent down the 3D pipeline 222 which has various 3D engine units such as an interpolator, a plane converter and a color calculator responsible for processing 3D data for the next frame to be displayed. Prior to the command parser 310 returning to the idle state 400, a 3D done indicator 324 is de-asserted by any one of the 3D engines indicating that the 3D pipeline 222 is busy. The de-assertion of the 3D done indicator 324 by a 3D engine in 3-D pipeline 222 causes the command parser 310 to wait in state 410 and the 3D pipeline 222 to go idle before decoding and forwarding instructions to either one of the blitter engines for execution. When all the 3D engine are done processing data, the 3D engines signal the command parser 310 to generate the 3D pipeline done signal by forwarding a 3D done indicator 324 to the command parser. The processing of the 3D pipeline's other 3D instructions are performed in a similar manner.

The command parser state transitions from idle 400 to TWD0 404 when the command parser 310 decodes a blit engine instruction. The command parser 310 decodes a blit engine instruction only when the 3D pipeline engine 222 is idle as indicated by its asserted 3D pipeline done signal and when the stretch blit engine 224 is idle as indicated by a deasserted stretch blit busy signal 328. The command parser 310 begins initiating processing of the blit engine instruction by, for example, writing values to be used by the blit engine 220 into a register during the TWDDA/TWDOB 405 and 406 and only when the stretch blitter engine and the 3D pipeline 222 are idle. Before the command parser 310 returns to the idle state 400, the blit engine busy signal 326 is asserted by the blit engine 220 indicating that it is busy executing the blit engine instruction, effectively causing the 3D pipeline 222 and the stretch blit engine 224 to wait in state 410 until the blit engine 220 goes idle before processing their own instructions.

The command parser state transitions from idle 400 to TWD1 407 when the command parser 310 decodes a stretch blit instruction. The command parser 310 decodes a stretch blitter instruction only when the 3D pipeline 222 and the blit engine 220 are idle as indicated by the asserted 3D pipeline done signal and the de-asserted blitter and stretch blitter busy signals. The command parser 310 begins pre-processing the stretch blit instruction in the TWD1A/TWD1B states 408 and 409 only when the blit engine 220 and the 3D pipeline 222 are both idle. Before the command parser 310 returns to the idle state 400, the stretch blit busy signal 328 is asserted, effectively causing the 3D pipeline 222 and the blitter engine 220 to wait in state 410 until the blit engine 220 goes idle. In this way, the drawing engines are only allowed to execute one at a time ensuring data coherency where one drawing engine reads an operand that is to be modified by another drawing engine.

What has been described is a method and apparatus for mutual exclusion of drawing engines. The present invention ensures data coherency among drawing engines where a first drawing engine is dependent on a second drawing engine to complete processing of data prior to the first drawing engine reading the data to be processed for a next frame to be displayed.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for mutual exclusion of drawing engine execution on a graphics device having a plurality of drawing engines, comprising:

checking a plurality of busy signals from the corresponding plurality of drawing engines to determine whether all the plurality of drawing engines are idle or any one is busy;

forwarding a first graphics instruction and a first associated data packet to a first drawing engine only if all of the plurality of drawing engines are idle to ensure data coherency.

2. The method of claim 1 wherein prior to checking the plurality of busy signals from the corresponding plurality of drawing engines, receiving the first graphics instruction and the first associated data packet.

3. The method of claim 2 further comprising detecting assertion of a first busy signal from the first drawing engine executing the first graphics instruction.

4. The method of claim 3 further comprising receiving a second graphics instructions and a second associated data packet, and forwarding the second graphics instruction and the second associated data packet to a second drawing engine only if the first busy signal from the first drawing engine is deasserted and all other drawing engines are idle.

5. The method of claim 3 further comprising receiving a second graphics instruction and a second associated data packet, and forwarding the second graphics instruction and the second associated data packet to the first drawing engine only if the first busy signal from the first drawing engine is de-asserted and all other drawing engines are idle.

6. The method of claim 1 wherein prior to forwarding the first graphics instruction and the first associated data packet, decoding the graphics instruction to determine to which drawing engine the graphics instruction is to be forwarded.

7. The method of claim 6 wherein prior to forwarding the first graphics instruction and the first associated data packet, holding the first graphics instruction and the first associated data packet in a drawing engine queue.

8. The method of claim 1 for mutual exclusion of drawing engine execution on a graphics device having a plurality of drawing engines wherein the forwarding of the first graphics instruction and the first associated data packet to the first drawing engine only if all of the plurality of drawing engines are idle ensures data coherency into system memory over a data bus.

9. The method of claim 1 for mutual exclusion of drawing engine execution on a graphics device having a plurality of drawing engines wherein the forwarding of the first graphics instruction and the first associated data packet to the first drawing engine only if all of the plurality of drawing engines are idle ensures data coherency into local memory of the graphics device.

10. An apparatus for mutual exclusion of drawing engine execution comprising:
 a plurality of drawing engines to execute graphics instructions for a next frame for display, said plurality of drawing engines each to assert a busy signal on a corresponding busy signal line when executing a graphics instruction and de-assert the busy signal when the execution of the graphics instruction is completed; and
 a command parser coupled to said plurality of drawing engines, said command parser to forward a first graphics instruction and a first data packet associated with the next frame to one of the plurality of drawing engines only when all the busy signals are de-asserted to ensure data coherency.

11. The apparatus of claim 8 wherein a graphics driver is coupled to the apparatus to generate and forward said graphics instruction and associated data packet to said command parser.

12. The apparatus of claim 11 wherein said command parser further comprises a drawing engine queue configured to holding said first graphics instruction and said first data packet received by said command parser from said graphics driver.

13. The apparatus of claim 12 wherein said one of the plurality of drawing engines asserts a busy signal to said command parser to indicate that said one of the plurality of drawing engines is executing and is not idle.

14. The apparatus of claim 13 wherein said one of the plurality of drawing engines de-asserts said busy signal to said command parser to indicate that it has completed execution and is idle.

15. The apparatus of claim 14 wherein said command parser further comprises a drawing engine execution logic coupled to said drawing engine queue and configured to fetch and forward a next graphics instruction and associated data packet to a next appropriate drawing engine to execute only when remaining said plurality of drawing engines are idle as indicated by their de-asserted busy signals.

16. A computer system for mutual exclusion of drawing engine execution comprising:
 a storage element configured to store a plurality of computer readable data, one of said plurality of computer readable data being a graphics driver configured to generate graphics instructions;
 a plurality of drawing engines configured to execute said graphics instructions for a next frame for display, said plurality of drawing engines each to assert a busy signal on a corresponding busy signal line when executing a graphics instruction and de-assert the busy signal when the execution of the graphics instruction is completed; and
 a command parser coupled to said plurality of drawing engines and said storage element, said command parser to forward a graphics instruction and a data packet associated with the next frame for display to one of the plurality of drawing engines only when all of the busy signals are de-asserted to ensure data coherency.

17. The system of claim 16 further comprising a graphics driver to generate and forward said graphics instruction and said data packet to said command parser.

18. The system of claim 17 wherein said command parser further comprises a drawing engine queue configured to holding said graphics instruction and said data packet received by said command parser from said graphics driver.

19. The system of claim 18 wherein said one of the plurality of drawing engines asserts a busy signal to said command parser to indicate that said one of the plurality of drawing engines is executing and is not idle.

20. The system of claim 19 wherein said one of the plurality of drawing engines de-asserts said busy signal to said command parser to indicate that it has completed execution and is idle.

21. The system of claim 20 wherein said command parser further comprises a drawing engine execution logic coupled to said drawing engine queue and configured to fetch and forward a next graphics instruction and associated data packet to a next appropriate drawing engine to execute while all remaining said plurality of drawing engines are idle as indicated by their de-asserted busy signals.

22. A method of providing data coherency to a frame of pixel data accessible by a plurality of drawing engines in a graphics processor, the method comprising:
 controlling one of the plurality of drawing engines to operate on a frame of data in response to a first drawing engine instruction; and
 controlling all other drawing engines of the plurality of drawing engines to not operate on the frame of data until the one of the plurality of drawing engines has completed operating on the frame of data in response to the first drawing engine instruction.

23. The method of claim 22 of providing data coherency to a frame of pixel data accessible by a plurality of drawing engines in a graphics processor, the method further comprising:
 controlling another one of the plurality of drawing engines to operate on a frame of data in response to a second drawing engine instruction after the one of the plurality of drawing engines has completed operating on the frame of data in response to the first drawing engine instruction; and
 controlling all other drawing engines of the plurality of drawing engines to not operate on the frame of data until the another of the plurality of drawing engines has completed operating on the frame of data in response to the second drawing engine instruction.

24. The method of claim 22 of providing data coherency to a frame of pixel data accessible by a plurality of drawing engines in a graphics processor, wherein, the controlling of the one and all other drawing engines of the plurality of drawing engines is responsive to the busy signal generated by each of the plurality of drawing engines.

* * * * *

UNITED STATES PATENT AND TRADEMARK OFFICE
CERTIFICATE OF CORRECTION

PATENT NO. : 6,078,339
DATED : June 20, 2000
INVENTOR(S) : Kim A. Meinerth et al.

It is certified that error appears in the above-identified patent and that said Letters Patent is hereby corrected as shown below:

Column 2,
Lines 21-22, delete "first instance of processor" and insert -- system memory --.
Line 31, after "memory accesses" insert -- into local memory and system memory over the AGP --.
Lines 59-60, after "(not shown" insert -- in FIG. 2 --.

Column 3,
Line 60, delete "in the AGP 302 and forwards".

Column 6,
Line 2, after "TWDDA/TWDOB" insert -- states --.

Signed and Sealed this

Second Day of April, 2002

Attest:

JAMES E. ROGAN
Attesting Officer
Director of the United States Patent and Trademark Office